(12) United States Patent
Bouzit-Benbernou

(10) Patent No.: US 10,776,749 B2
(45) Date of Patent: *Sep. 15, 2020

(54) SECURE LOCKER SYSTEM FOR THE DEPOSITION AND RETRIEVAL OF SHIPMENTS

(71) Applicant: NEOPOST TECHNOLOGIES, Bagneux (FR)

(72) Inventor: Samira Bouzit-Benbernou, Chatenay-Malabry (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 656 days.

This patent is subject to a terminal disclaimer.

(21) Appl. No.: 14/590,441

(22) Filed: Jan. 6, 2015

(65) Prior Publication Data
US 2015/0193732 A1 Jul. 9, 2015

(30) Foreign Application Priority Data

Jan. 6, 2014 (EP) .................................... 14305012

(51) Int. Cl.
*G06Q 10/08* (2012.01)
*G07B 17/00* (2006.01)
(Continued)

(52) U.S. Cl.
CPC .......... *G06Q 10/0836* (2013.01); *B65B 5/04* (2013.01); *B65B 7/16* (2013.01); *B65B 57/00* (2013.01);
(Continued)

(58) Field of Classification Search
None
See application file for complete search history.

(56) References Cited

U.S. PATENT DOCUMENTS 4,836,352 A 6/1989 Tateno et al.
5,974,111 A * 10/1999 Krug ...................... G01N 23/20
378/53
(Continued)

FOREIGN PATENT DOCUMENTS

CN 201833357 U 5/2011
FR 2 851 360 A1 8/2004
(Continued)

OTHER PUBLICATIONS

Home Delivery vs Parcel Lockers: an economic and environmental assessment, Maria Giuffrida, 2012, p. 1-2 (Year: 2012).*
(Continued)

*Primary Examiner* — Kevin H Flynn
*Assistant Examiner* — Ibrahim N El-Bathy
(74) *Attorney, Agent, or Firm* — Cozen O'Connor

(57) ABSTRACT

A system for securely controlling deposition and retrieval of shipments (40), including a managing distribution centre, at least one electronic locker unit connected to the managing distribution centre through a communication network, and having several lockable compartments (28*i*) of different sizes, wherein said at least one electronic locker unit comprises a weighing shipment module (50) located inside each compartment (28*i*) and made up of an arrangement of several thin flexible force sensors, linked together to circuit board, located under upper bearing plate and attached to bottom of the compartment within respective active measuring areas.

18 Claims, 4 Drawing Sheets

(51) Int. Cl.
  *G07F 17/12* (2006.01)
  *G06Q 50/32* (2012.01)
  *B65B 5/04* (2006.01)
  *B65B 7/16* (2006.01)
  *B65B 57/00* (2006.01)
  *A47G 29/14* (2006.01)

(52) U.S. Cl.
  CPC ....... *G06Q 50/32* (2013.01); *G07B 17/00193* (2013.01); *G07F 17/12* (2013.01); *A47G 29/141* (2013.01); *A47G 2029/145* (2013.01); *G07B 2017/00209* (2013.01); *G07B 2017/00443* (2013.01); *G07B 2017/00685* (2013.01)

(56) References Cited

U.S. PATENT DOCUMENTS

| | | | |
|---|---|---|---|
| 6,323,782 B1 | 11/2001 | Stephens et al. | |
| 6,707,381 B1* | 3/2004 | Maloney | G07C 9/00103 340/568.1 |
| 6,895,241 B2 | 5/2005 | Hara | |
| 2002/0007281 A1* | 1/2002 | Gil | G07B 17/00193 705/407 |
| 2002/0080030 A1* | 6/2002 | Inomata | G07F 17/12 340/542 |
| 2003/0138147 A1* | 7/2003 | Ongkojoyo | G06K 9/00 382/224 |
| 2004/0059647 A1* | 3/2004 | Hudson | G06Q 10/06 705/28 |
| 2004/0076544 A1 | 4/2004 | Dao | |
| 2005/0068178 A1 | 3/2005 | Lee et al. | |
| 2005/0171854 A1* | 8/2005 | Lyon | G01G 19/4144 705/24 |
| 2005/0264422 A1 | 12/2005 | Watanabe et al. | |
| 2006/0043298 A1* | 3/2006 | Kawase | G01N 21/3581 250/339.06 |
| 2006/0054824 A1 | 3/2006 | Federici et al. | |
| 2006/0098842 A1* | 5/2006 | Levine | G06Q 10/08 382/101 |
| 2006/0152339 A1* | 7/2006 | Mercier | G07F 17/12 340/5.73 |
| 2007/0145973 A1 | 6/2007 | Bertozzi et al. | |
| 2009/0119232 A1 | 5/2009 | Mercier et al. | |
| 2009/0285353 A1 | 11/2009 | Ellenbogen et al. | |
| 2011/0174551 A1* | 7/2011 | Lucas | G01G 3/1412 177/1 |
| 2012/0194043 A1 | 8/2012 | Turner et al. | |
| 2012/0211397 A1 | 8/2012 | Kilian | |
| 2012/0326840 A1 | 12/2012 | Frankenberg et al. | |
| 2013/0119129 A1* | 5/2013 | Amdahl | G06Q 20/385 235/381 |
| 2013/0248425 A1* | 9/2013 | Kunnen | A22C 25/04 209/592 |
| 2013/0261792 A1* | 10/2013 | Gupta | G06Q 10/08 700/232 |
| 2014/0035721 A1* | 2/2014 | Heppe | G07C 9/00912 340/5.54 |
| 2015/0077221 A1* | 3/2015 | Peters | G07F 17/00 340/5.28 |
| 2015/0112887 A1* | 4/2015 | Camp | G06Q 10/0836 705/339 |
| 2015/0193733 A1 | 7/2015 | Bouzit-Benbernou | |
| 2016/0294601 A1 | 10/2016 | Frederick | |
| 2017/0193258 A1 | 7/2017 | Venture et al. | |
| 2017/0220828 A1 | 8/2017 | Venture et al. | |

FOREIGN PATENT DOCUMENTS

| | | |
|---|---|---|
| WO | 2004/064581 A1 | 8/2004 |
| WO | 2006/050412 A1 | 5/2006 |
| WO | 2013/170316 A1 | 11/2013 |

OTHER PUBLICATIONS

European Search Report of EP 14 30 5012 dated Mar. 17, 2014.
European Search Report, dated Mar. 14, 2014, for European Application No. 14 30 5011, 2 pages.
Extended European Search Report, dated Jul. 20, 2017, for European Application No. 17305016.2-1806, 6 pages.
Extended European Search Report, dated Jun. 23, 2016, for European Application No. 16305010.7-1806, 6 pages.
Extended European Search Report, dated Mar. 28, 2014, for European Application No. 14305011.0-1953, 8 pages.
Extended European Search Report, dated Nov. 28, 2014, for European Application No. 14305012.8-1953, 9 pages.
Extended European Search Report, dated Oct. 15, 2014, for European Application No. 14305012.8-1953, 9 pages.
Partial European Search Report, dated Apr. 11, 2014, for European Application No. 14305012.8-1953, 6 pages.
Venture et al., "Automated Autovalidating Locker System," U.S. Appl. No. 15/863,633, filed Jan. 5, 2018, 43 pages.

* cited by examiner

SECURE LOCKER SYSTEM FOR THE DEPOSITION AND RETRIEVAL OF SHIPMENTS

TECHNICAL FIELD

The present invention relates to a method and system for depositing by a delivery agent, shipments into an electronic locker system comprising several lockable compartments, and for retrieving these shipments thereafter.

BACKGROUND

There are many references in prior art on electronic locker systems used for dropping-off, storing and picking up various kinds of shipments such as parcels or packages.

EP 1 587 401 discloses a method for depositing mail by a deliverer of mail in an electronic locker system provided with several lockable compartments. The method is characterized in that a controller of the locker system causes one or several compartments to open in order to deposit mail and at least one new compartment opens automatically when a compartment is closed and when detecting means of the locker system have detected information allocated prior to sending.

U.S. Pat. No. 6,895,241 describes a door-lock-opening method for a home delivery locker which includes a home delivery locker and a managing company that are connected to each other through a line, the managing company controlling depositing and taking-out processes of the home delivery locker; a person who wishes to take out a parcel addressed to the person from the home delivery locker is allowed to communicate with the managing company through a mobile terminal such as a mobile telephone, and in the case when the company has confirmed that the person who made contact therewith is a registered user of the home delivery locker, the company releases the lock of the door of the home delivery locker housing the parcel.

U.S. Pat. No. 6,323,782 relates to a controlled access storage system for the delivery and retrieval of an item having a transponder associated therewith. In this regard, the transponder is programmed with data specific to the item. The transponder is configured to transmit item identification data. The storage system is provided with an enclosure sized and configured to store the item. The storage system is further provided with a locking mechanism for unlocking the enclosure for access therein in response to an unlock signal. The storage system is further provided with a transponder communications device which is configured to electrically interrogate the transponder and to receive the item identification data in response. The storage system is further provided with access control circuitry which is disposed in operable communication with the transponder communications device and the locking mechanism, for selectively providing an unlock signal to the locking mechanism in response to the received item identification data.

Though all the previous locker systems generally prove satisfactory, improvements in the delivery process of packages and transportable items in general always remain a recurrent topic of close attention. Enhancing the quality of security of the delivery process therefore continues to be highly desirable. Errors often happen at any stage of the shipment process, from the delivery centre to the delivery point.

OBJECT AND DEFINITION OF THE INVENTION

It is therefore an object of the invention to provide an improved secure locker method and system for the delivery and retrieval of shipments which ensures in particular that the shipment deposited inside the locker is the right one.

Another object of the invention consists in proposing such a locker system that is simple to reduce into practice, user-friendly and not too expensive, and the technical adjustments of which do not impact its architecture.

According to a first aspect of the invention, these objects are achieved through the provision of a method for securely controlling deposition and retrieval of shipments on at least one electronic locker unit connected to a managing distribution centre through a communication network, and having several lockable compartments of different sizes, comprising the followings steps executed at the electronic locker unit:
 entering an identification code of the shipment and retrieving specific information associated with the shipment;
 opening a compartment of the electronic locker unit;
 depositing the shipment inside the compartment;
 weighing the shipment with a weighing module located inside the compartment and comparing in a processing module the measured weight with the weight included within the specific information;
 locking the compartment containing the shipment; and
 logging the compartment as being filled and locked upon close match and validation of the comparison of the weight.

Furthermore, the method comprises acquiring a shipment content's shape with a shape measurement module located inside the compartment, comparing the determined shipment content's shape with the one included within the specific information associated with the shipment and logging the compartment as being filled and locked upon close match and validation of the comparisons of the weight and the shipment content's shape.

This secure locker system thus aims at using the weight and/or the shape of shipment content as a valid indication or recognition of a true item for delivery. This arrangement permits to limit fraudulent delivery.

According to another aspect of the invention, the method also comprises identifying the delivery agent before entering the identification code and retrieving specific information associated with the shipment.

According to yet another object of the invention, the method comprises notifying the managing distribution centre of the safe delivery of the shipment with an electronic message linked to the identification code.

According to still another aspect of the invention, it also comprises just after entering the identification code and retrieving the specific information associated with the shipment, automatically indicating and/or opening at least an appropriate compartment according to the dimensions and/or the weight of the shipment.

This useful feature facilitates the delivery process in significantly reducing the time needed by the delivery agent for completing the filling of all relevant compartments of the electronic locker unit.

According to another aspect of the invention, the at least one appropriate compartment is indicated according to predefined preferences such as the closest available to the delivery agent.

According to yet another aspect of the invention, at least part of the specific information is extracted from a database available in a sender computer and sent to the managing distribution centre prior to delivery of the shipment.

Advantageously, the determined shipment content's shape is also compared to hazardous items listed in a surveillance bank of pictures for sending a warning message if at least one of such items is identifiable.

The specific information can be linked to an identification code such as a barcode or a RFID tag affixed to shipment.

Preferably, the specific information is included in a remote database accessible by said electronic locker unit.

The invention also relates to a system for securely controlling deposition and retrieval of shipments, comprising:
a managing distribution centre,
at least one electronic locker unit connected to the managing distribution centre through a communication network, and having several lockable compartments of different sizes,
wherein said at least one electronic locker unit comprises a weighing shipment module located inside each compartment and made up of an arrangement of several thin flexible force sensors, linked together to a circuit board, located under upper bearing plate and attached to bottom of the compartment within respective active measuring areas.

A weighing module based on these specific sensors provides an essential compactness for designing the locker compartment while proving really affordable. Moreover, the resulting measurement accuracy provided proves sufficient for representing a valid estimation of weight.

According to another aspect of the invention, the estimated weight of shipment derives from individual results provided respectively by said flexible force sensors and all the individual measuring results are added to provide the final estimated weight of shipment.

Preferably, said at least one electronic locker unit further comprises a shape measurement module located inside each compartment for acquiring a shipment content's shape. Said shape measurement module comprises a terahertz vision device mounted on the ceiling of compartment for covering any shipment resting on said upper bearing plate.

This specific combination permits to produce an inexpensive remarkable solution for identifying the shape of the content of an object through its body.

Other aspects of the invention are discussed further in the detailed description that follows.

BRIEF DESCRIPTION OF DRAWINGS

The invention can be better understood in reading the following detailed description accompanied by illustrative and non-limiting examples with reference to the drawings, in which.

DETAILED DESCRIPTION OF PREFERRED EMBODIMENT

Figure 1:
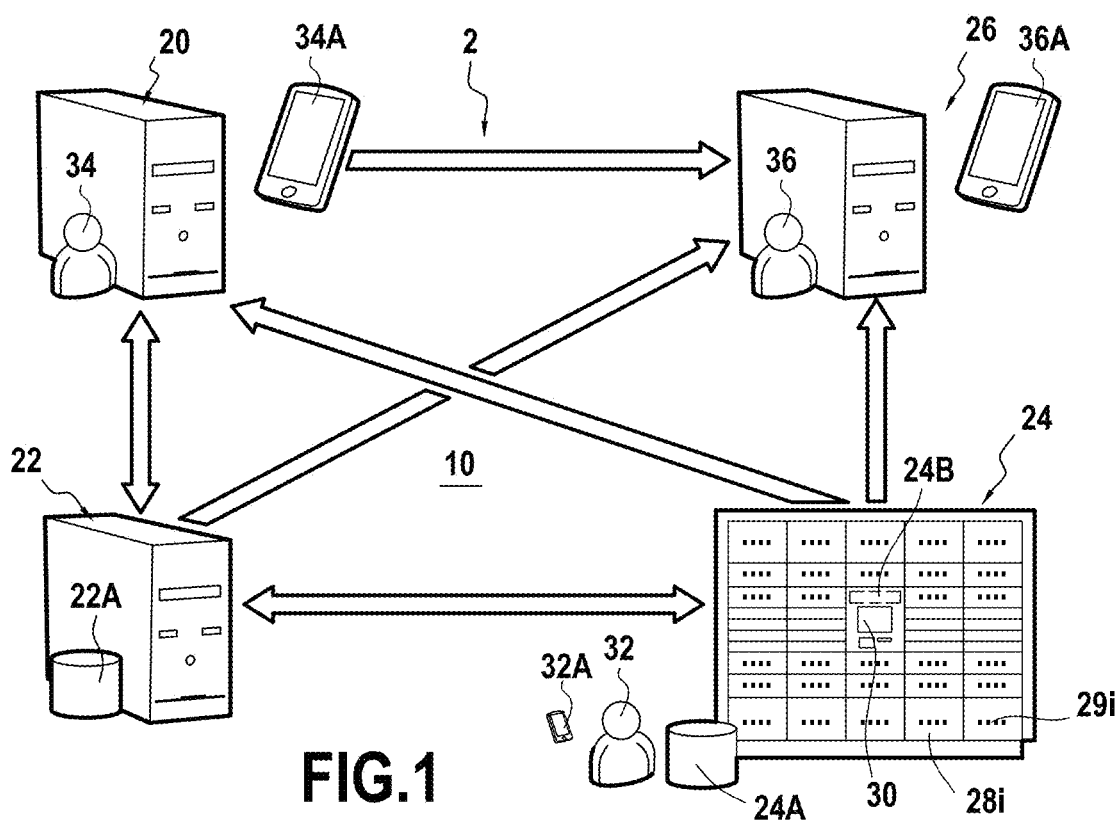
FIG. 1 schematically shows the secure locker system of the invention.
Figure 2:
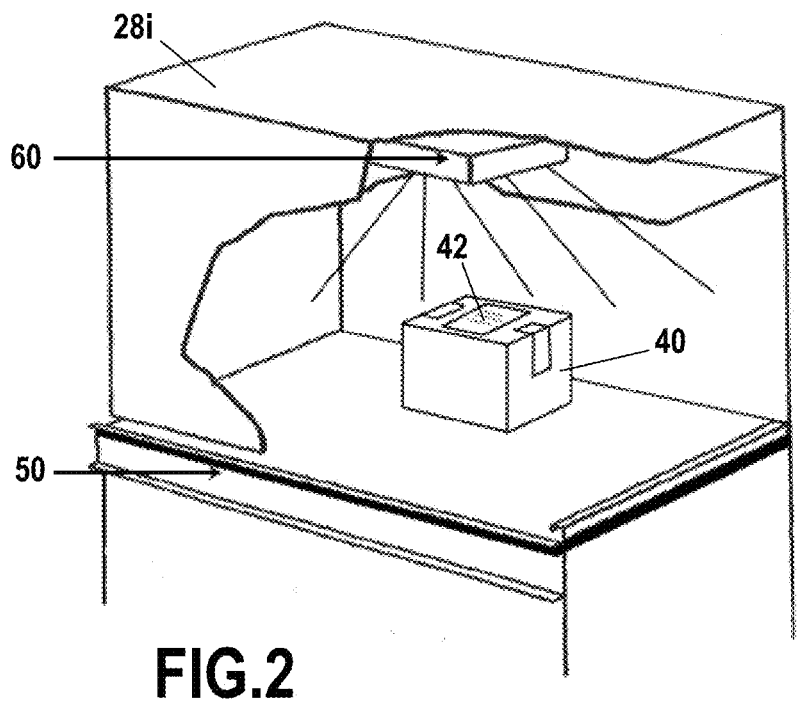
FIG. 2 is a perspective view of a compartment of an electronic locker unit in accordance with the invention.

In a preferred embodiment of the invention, a secure locker system 2 as shown in FIG. 1 and FIG. 2 comprises a communication network 10 linking at least a sender computer 20, a managing distribution centre 22 comprising a managing distribution database 22A, at least an electronic locker unit 24 with its locker unit database 24A and processing module 24B, and at least a recipient computer 26. The secure locker system is generally controlled by computer means, electronic means and mechanical means for operating the electronic locker unit through all its input and output means. As an alternative embodiment, the managing distribution database and the locker unit database can be implemented in a remote database (for instance a cloud database not shown).

The electronic locker unit typically comprises a series of available compartments 28$i$ of different sizes and a set 30 of monitor, scanner and keyboard or touchscreen. Each compartment comprises an automatic door and can support an indicating luminous sign 29$i$. The bottom of the electronic locker unit preferably comprises compartment of larger size assigned to heavy or bulky shipments.

Figure 3A:
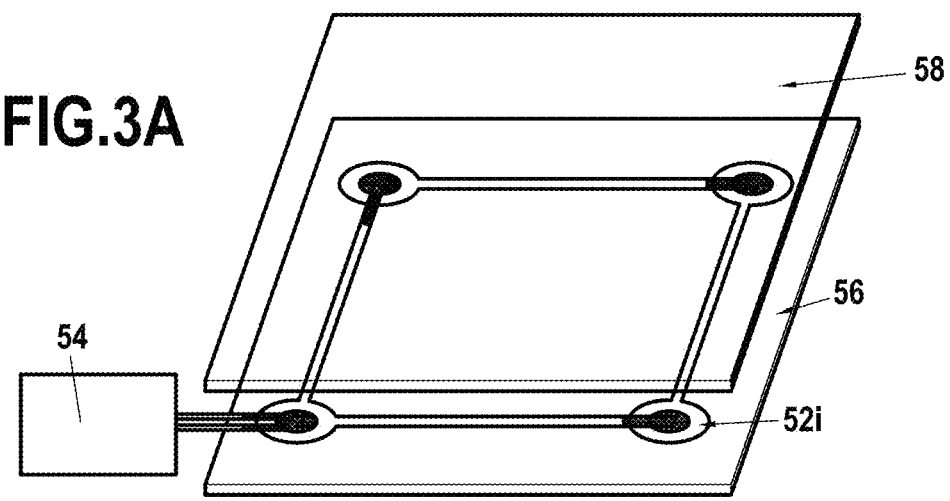
FIG. 3A and FIG. 3B are schematic top and side views of weighing means associated with the compartment of FIG. 2.
Figure 3B:
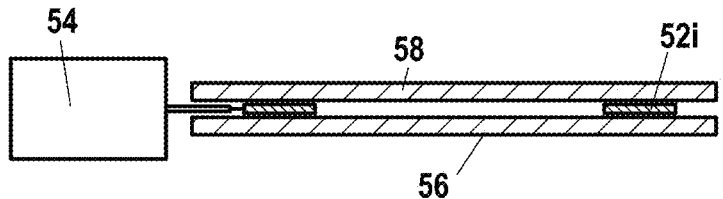

As illustrated on FIG. 2, for tracking purposes, the shipment 40 bears a standard identification means 42 of any kind such as a barcode (or other type of codes) and/or a RFID tag. Each compartment comprises a weighing module 50 and a shape measurement module 60. On FIGS. 3A and 3B, each weighing module comprises a series of thin flexible force sensors 52$i$ linked together to a circuit board 54, attached to a lower base 56, and located under an upper bearing plate 58.

Figure 4:
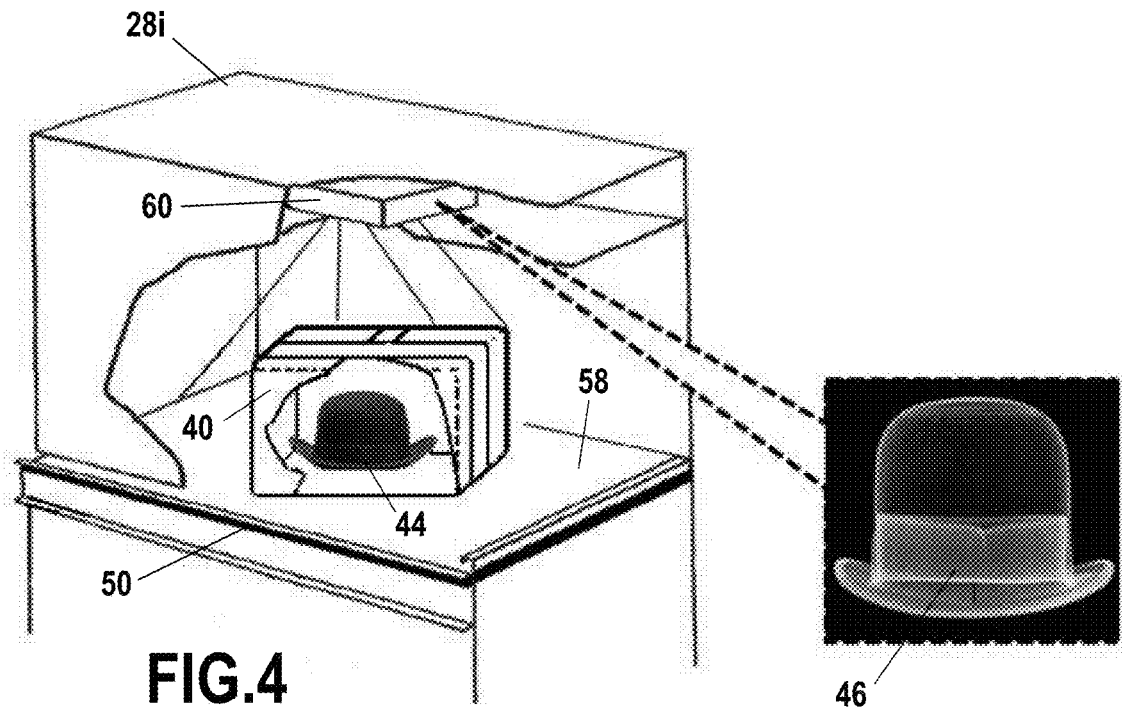
FIG. 4 is similar to FIG. 2 and illustrates the shape measurement module of the invention mounted inside the compartment.

As shown on FIG. 4, the shape measurement module 60 is mounted on the ceiling of the compartment for covering any shipment resting on the upper bearing plate 58. A "seeing through objects vision" technology such as a combination of CMOS and a microchip that discerns a terahertz band of the electromagnetic spectrum (terahertz vision device), allows detecting the shape of the content 44 inside the shipment 40, and generating a form picture 46.

The secure locker system operates as follows in accordance with complementary flow charts of FIG. 5 and FIG. 6.

Figure 5:
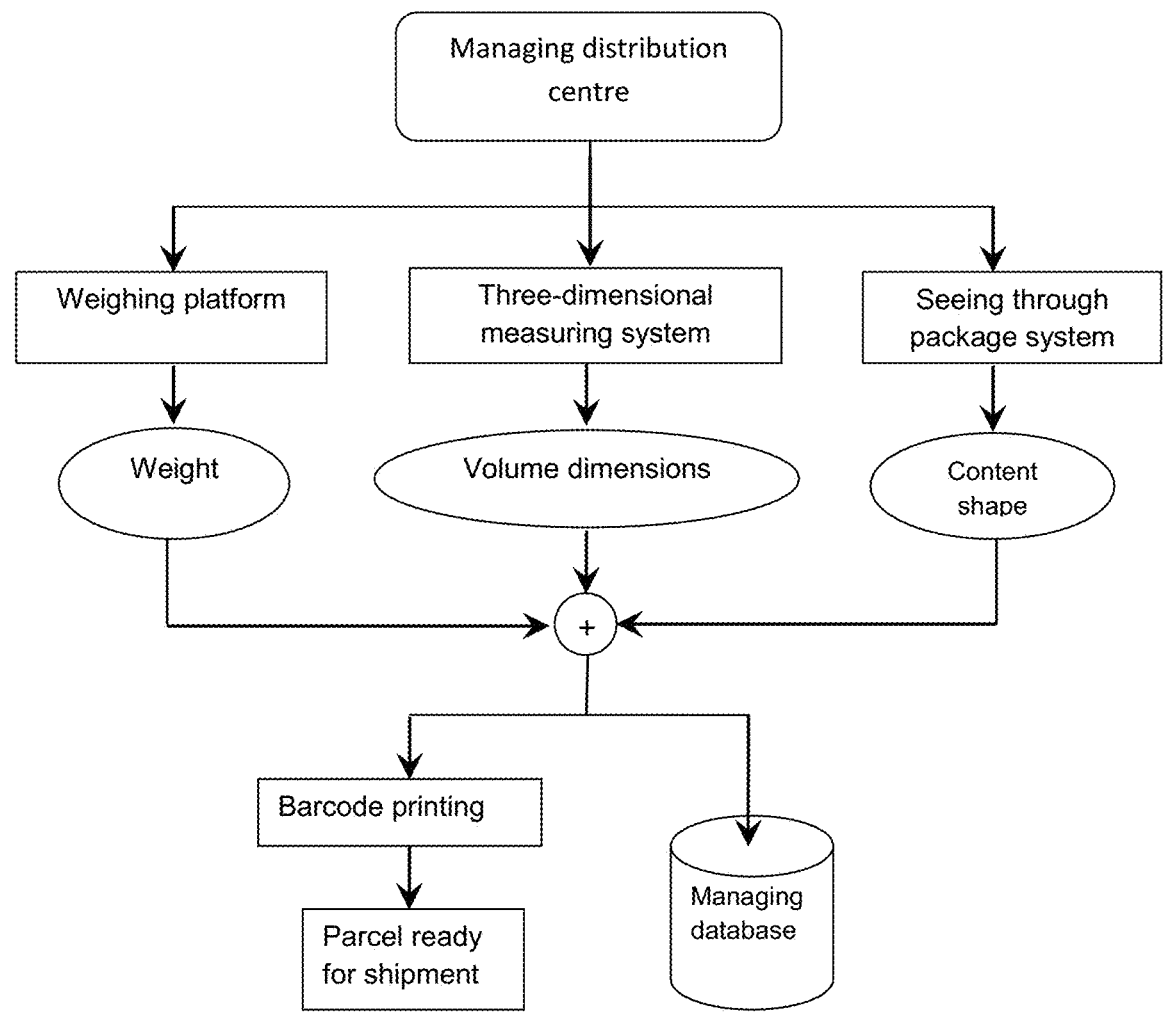
FIG. 5 and FIG. 6 are two complementary flow charts which illustrate the successive operating steps of the locker control method according to the invention.

As shown on FIG. 5, the shipment is weighed at the managing distribution centre 22 where it is received. The dimensions of the shipment are also determined using a measuring system such as 3D scanning sensor or 2D sensor (CMOS or CCD) with/without a laser source combination.

The shape of the shipment content is also measured using "seeing through package technology" such as a combination of CMOS and a terahertz vision device that discerns a terahertz band of the electromagnetic spectrum.

Alternatively, at least part of this information is extracted from a database available in a sender computer and sent to the managing distribution centre prior to delivery of the shipment.

Notably, the shape of the shipment content can be extracted from a bank of pictures available in the sender computer 20. These pictures can be provided for instance by the manufacturer of the product contained in the shipment. In this case, various views of the content (e.g. from top, front, side) may be available.

The above specific information (weight, dimensions and shape) are linked to an identification code such as barcode and/or a RFID tag affixed to the packaging.

This specific information is recorded in the managing distribution database 22A of the managing distribution centre for various possible processing operations comprising, sending the information to the appropriate electronic locker unit 24 where the shipment is expected, notifying the recipient and/or the sender, storage and archiving. Alternatively, the specific information can be recorded in a remote database distinct from the managing distribution database and accessible by the electronic locker unit.

However, if preferably the specific information is present in the electronic locker unit further to a sending of the managing distribution centre as previously explained, it must be noted that this information can also be downloaded into a mobile terminal 32A of the delivery agent when leaving the distribution centre. The information is further transmitted to the electronic locker unit 24 along with the scanning of the identification code 42.

Figure 6:
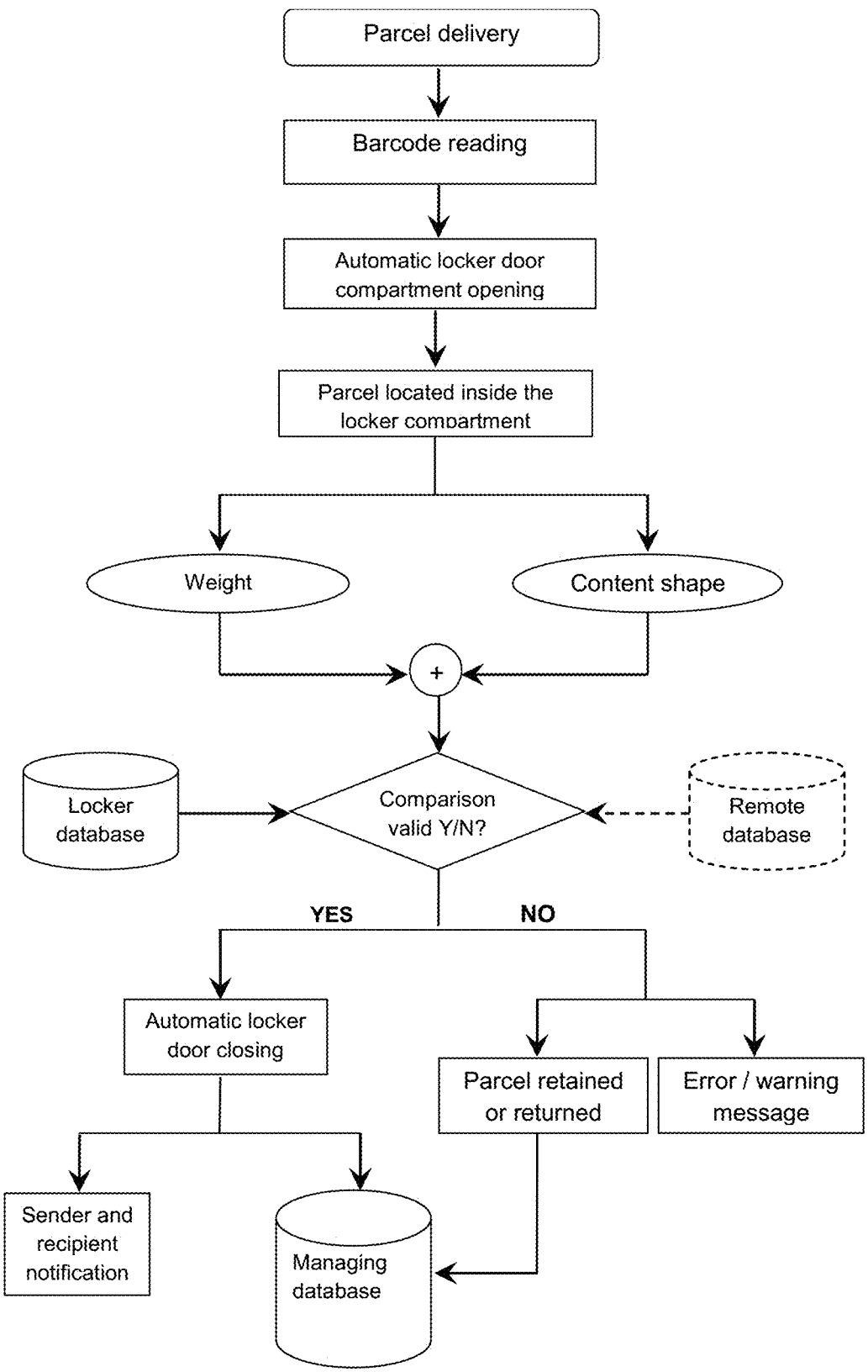

As depicted on FIG. 6, the delivery agent identifies himself/herself via e.g. a code at electronic locker unit 24 of secure locker system 2 into which he/she logs. The delivery agent then scans identification code 42 on shipment 40 with the scanner (or enters this code on the keyboard or touchscreen) of the control desk 30 causing the door of the appropriate locker compartment 28i to automatically open according to the size and the weight of the shipment.

Alternatively, the locker system automatically indicates to the delivery agent, in lighting at least a sign 29i, at least an appropriate compartment based on the specific information such as the dimensions and the weight of the shipment or on predefined preferences such as the closest compartment available to the delivery agent. Preferably, when the shipment appears to be bulky or heavy, this sign can indicate the bottom of the electronic locker unit. After selection, the electronic locker unit automatically opens the appropriate compartment. The shipment is positioned inside the locker compartment where its weight and content's shape are measured with respective modules 50, 60. This information is sent to the processing module 24B for comparison with the locker unit database 24A and validation steps.

More particularly, if the compartment only comprises a weighing module 50, a close match and validation of the comparison of the weight is sufficient to lock (securely close) the compartment containing the shipment and then log the compartment as being filled and locked. But if the compartment comprises a weighing module 50 and a shape measurement module 60, a close match and validation of the comparisons of the weight and of the shipment content's shape are necessary to lock the compartment containing the shipment and then log the compartment as being filled and locked.

The managing distribution centre is automatically notified of the safe delivery of the shipment with an electronic message linked to the identification code. Optionally the sender 34 and the recipient 36 may also be automatically notified directly, for instance on their portable phone 34A, 36A.

Otherwise, an error and/or warning message will pop up on the display of the electronic locker unit. Simultaneously, the managing distribution centre is notified. The shipment is either retained or returned to the managing distribution centre for further verification.

Additional modifications and improvements of the present invention may also be apparent to those of ordinary skill in the art. Thus, the particular combination of features described and illustrated herein is intended to represent only one embodiment of the present invention, and does not serve as a limitation of alternative devices within the spirit and scope of the invention.

For instance, if the compartment only comprises a shape measurement module 60, a close match and validation of the comparison of the shipment content's shape is sufficient to lock the compartment containing the shipment and log the compartment as being filled and locked.

The determined shipment content's shape could also be compared to hazardous items listed in a surveillance bank of pictures within the locker unit database (or remotely within the managing distribution database) for sending a warning message if at least one of such items is identifiable. In this case, the compartment can be locked and the parcel retained for further verification.

Although the invention is intended primarily for the delivery of shipments to recipients, it can also be used by the recipients for returning these shipments to the senders. The same shipment ID may be reused for the return, or another shipment ID may be provided by the managing distribution centre. This new shipment ID may be printed on a label which is sent to the recipient, affixed to the shipment and scanned at the electronic locker unit when depositing the shipment. This new shipment ID may also be provided in the form of a password, which is entered at the electronic locker unit via the keyboard or touchscreen. Similarly, the system may be used by a sender for sending a shipment. In this case, the specific information (weight, dimensions . . . ) may be entered at the sender computer in order to be associated with a shipment ID.

The invention claimed is:

1. An automated method for securely controlling deposition and retrieval of shipments on at least one electronic locker unit connected to a managing distribution center through a communication network, and having several lockable compartments of different sizes, the method comprising:

reading, at a processing module of an electronic locker unit, an identification code that has been provided as part of the shipment and retrieving, from the managing distribution center over the communication network, specific information associated with the shipment based on the identification code, wherein the specific information has been previously associated with the identification code and includes previously-determined weight information and previously-determined shape information of at least one item to be included as content of the shipment;

enabling, by the processing module, a compartment of the electronic locker unit to be opened;

receiving the shipment inside the compartment, the shipment having an opaque exterior wall containing the at least one item as content of the shipment;

weighing the shipment with a weighing module located inside the compartment to acquire a current weight measurement and comparing, by the processing module, the current weight measurement with the previously-determined weight information included within the specific information;

acquiring, through the opaque exterior wall using a combination of CMOS and terahertz-band sensors, a current shape measurement of the content within the shipment using a shape measurement module located inside the compartment, and comparing, by the processing module, the current shape measurement of the content with the previously-determined shape information included within the specific information;

causing, by the processing module, as a result of validation of comparison of the current weight measurement and the current shape measurement of the content with the previously-determined weight information and the previously-determined shape information, respectively, included within the specific information, the compartment containing the shipment to be locked; and logging the compartment as being filled and locked upon close match and validation of comparison of the measured weight and the acquired shape with the weight information and the shape information included within the specific information.

2. The method of claim 1, further comprising identifying a delivery agent before receiving the identification code and retrieving specific information associated with the shipment.

3. The method of claim 1, further comprising notifying, as a result of logging the compartment as being filled and locked, the managing distribution center over the communication network of the safe delivery of the shipment with an electronic message linked to the identification code.

4. The method of claim 1, further comprising just after receiving the identification code and retrieving specific information associated with the shipment, automatically indicating or opening at least one appropriate compartment according to information regarding one or more physical characteristics of the shipment included in the specific information.

5. The method of claim 4 wherein the at least one appropriate compartment is indicated according to pre-defined preferences, the predefined preferences including the closest compartment available to the delivery agent.

6. The method of claim 1 wherein at least part of the specific information is extracted from a database available in a sender computer and is sent to the managing distribution center prior to delivery of the shipment.

7. The method of claim 1 wherein a shape of the shipment content is determined and compared to shape information of a set of hazardous items listed in a surveillance bank of pictures for sending a warning message if at least one of such items is identifiable.

8. The method of claim 1 wherein the specific information is linked in data storage to the identification code, and the identification code is obtained from an identifier affixed to shipment.

9. The method of claim 1 wherein the specific information is included in a remote database accessible by said electronic locker unit.

10. The method of claim 1, wherein the weighing module is made up of an arrangement of several thin flexible force sensors, linked together to a circuit board, located under upper bearing plate on which the shipment is directly deposited and attached to bottom of the compartment within respective active measuring areas.

11. A system for securely controlling deposition and retrieval of shipments, the system comprising:
at least one electronic locker unit connected to a remotely-located managing distribution center through a communication network, and including lockable compartments, each compartment being arranged to receive a shipment item containing content and including a shipment-specific identification code indicator;
wherein said at least one electronic locker unit comprises a weighing module located inside each compartment for acquiring a weight measurement of a shipment item deposited in that compartment, the weighing module including an arrangement of several thin flexible force sensors, linked together to a circuit board, the force sensors located under an upper bearing plate on which the shipment item is to be deposited and attached to a bottom of the compartment within respective active measuring areas;
wherein said at least one electronic locker unit further comprises a shape measurement module, located inside each compartment, for acquiring a shape measurement of a content of the shipment item through an opaque enclosure of the shipment item using a combination of CMOS and terahertz-band sensors; and
wherein the at least one locker unit is to accept a first shipment item deposited in a first compartment and to lock the first compartment in response to the acquired weight measurement and shape measurement each corresponding respectively to previously-determined weight and shape expectation information supplied via the managing distribution center and accessed using the shipment-specific identification code of the identification code indicator, wherein the weight and shape expectation information is previously determined for the content of the shipment and associated with the identification code.

12. The system of claim 11 wherein an estimated weight of shipment derives from individual measuring results provided respectively by said flexible force sensors.

13. The system of claim 12, wherein all of the individual measuring results are added to provide the estimated weight of shipment.

14. The system of claim 11, wherein said shape measurement module is mounted on the ceiling of each compartment for covering any shipment resting on said upper bearing plate.

15. An automated method for securely controlling deposition and retrieval of shipments on at least one electronic locker unit connected to a managing distribution center through a communication network, and having several lockable compartments of different sizes, the method comprising:
receiving, at a processing module of an electronic locker unit, an identification code that has been provided as part of a shipment item and retrieving specific information from the managing distribution center over the communication network, the specific information being associated with the shipment item based on the identification code, wherein the specific information has been previously associated with the identification code and includes previously-determined weight information and previously-determined shape information of at least one content item to be included as part of the shipment item;
unlocking, by the electronic locker unit, a compartment of the electronic locker unit;
receiving the shipment item inside the compartment, the shipment item having an opaque exterior wall containing the at least one content item;
weighing the shipment item by the electronic locker unit with a weighing module located inside the compartment to acquire a current weight measurement and comparing, in a processing module in the electronic locker unit, the current weight measurement with the previously-determined weight information included within the specific information;
acquiring, by the processing module of the electronic locker unit, through the opaque exterior wall using a combination of CMOS and terahertz-band sensors, a current shape measurement of the content within the shipment item with a shape measurement module located inside the compartment;
comparing, by the processing module of the electronic locker unit, the current shape measurement of the content with the previously-determined shape information included within the specific information associated with the shipment item; and
locking, by the locker unit, the compartment containing the shipment item and logging the compartment as being filled and locked as a result of validation of comparison of the current weight measurement and the current shape measurement of the content with the previously-determined weight information and the previously-determined shape information, respectively, included within the specific information.

16. An electronic locker unit for securely controlling deposition and retrieval of shipments, the electronic locker unit comprising:
   a plurality of compartments having doors automatically lockable by the electronic locker unit;
   a weighing module located in each of the plurality of compartments;
   a shape measurement module located in each of the plurality of compartments, the shape measurement module including a combination of CMOS and terahertz-based sensors; and
   a processing module controlling operation of the electronic locker unit to:
      receive an identification code that has been provided as part of the shipment and retrieve, from a remote storage location, specific information associated with the shipment based on the identification code, the specific information having been previously determined and indicating physical characteristics of the shipment including known weight information, known volume information, and known content shape information of content inside the shipment;
      automatically indicate or open at least one appropriate compartment of the electronic locker unit according to at least one of the one or more physical characteristics of the specific information;
      in response to receipt of the shipment inside that compartment:
         weigh the shipment with the weighing module located inside the compartment to acquire a measured weight and compare the measured weight with the known weight information included within the specific information; and
         acquire a shape of the content of the shipment through an opaque enclosure of the shipment using the combination of CMOS and terahertz-band sensors and compare the acquired shape of the content with the known content shape information included within the specific information; and
      in response to comparison and validation of (a) the measured weight and the known weight information included within the specific information, and (b) the acquired shape of the content of the shipment and the known content shape information included within the specific information:
         lock the compartment containing the shipment, and
         log the compartment as being filled and locked.

17. The electronic locker unit of claim 16, the processing module further controlling the electronic locker unit to provide over the communication network a notification to a remote managing distribution center indicating that the shipment is locked in the compartment.

18. The electronic locker unit of claim 16, wherein the weighing module is made up of an arrangement of several thin flexible force sensors, linked together to a circuit board, located under upper bearing plate on which the shipment is directly deposited and attached to bottom of the compartment within respective active measuring areas.

* * * * *